United States Patent
Fechser et al.

(10) Patent No.: US 6,430,652 B1
(45) Date of Patent: Aug. 6, 2002

(54) METHOD AND APPARATUS FOR STREAMING DATA IN A DATA PROCESSING SYSTEM

(75) Inventors: David A. Fechser, Fort Collins; Burt Wagner, Salida, both of CO (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/000,582

(22) Filed: Dec. 30, 1997

(51) Int. Cl.$^7$ ............................................... G06F 12/00
(52) U.S. Cl. ............................ 711/111; 711/113; 710/57
(58) Field of Search ................................ 711/112, 113, 711/117, 2; 710/57; 369/32

(56) References Cited

U.S. PATENT DOCUMENTS

| | | | | |
|---|---|---|---|---|
| 4,583,163 A | * | 4/1986 | Kobayashi et al. ............. | 711/2 |
| 5,276,662 A | * | 1/1994 | Shaver, Jr. et al. ............ | 369/32 |
| 5,339,413 A | | 8/1994 | Koval et al. ................. | 395/650 |
| 5,404,511 A | | 4/1995 | Notarianni .................. | 395/600 |
| 5,450,546 A | * | 9/1995 | Krakirian ..................... | 710/57 |
| 5,487,167 A | | 1/1996 | Dinallo et al. ............... | 395/650 |
| 5,535,339 A | | 7/1996 | Kim ........................... | 395/280 |
| 5,568,614 A | | 10/1996 | Mendelson et al. ..... | 395/200.08 |
| 5,592,630 A | * | 1/1997 | Yamagami et al. ......... | 711/117 |
| 5,896,351 A | * | 4/1999 | Misaizu et al. ............... | 369/32 |

* cited by examiner

*Primary Examiner*—Do Hyun Yoo
*Assistant Examiner*—Nasser Moazzami
(74) *Attorney, Agent, or Firm*—Carstens, Yee & Cahoon, L.L.P.

(57) ABSTRACT

An improved method and apparatus for transferring data in a CD-ROM system. The CD-ROM system includes a buffer manager for identifying the capacity of a buffer memory used to store data from a disc. The buffer manager controls the transfer of data into and out of the buffer memory. Each time a sector of data is transferred from a disc into the buffer memory, a counter is incremented to track the amount of data in the buffer memory. If the counter equals the capacity of the buffer memory, the transfer of data from the disc is halted. Further transfer of data is not allowed until buffer memory is available.

26 Claims, 13 Drawing Sheets

US 6,430,652 B1

METHOD AND APPARATUS FOR STREAMING DATA IN A DATA PROCESSING SYSTEM

BACKGROUND OF THE INVENTION

1. Technical Field

The present invention relates generally to an improved data processing system and in particular to an optical disc streaming architecture. Still more particularly, the present invention relates to a method and apparatus for transferring data from an optical disc.

2. Description of the Related Art

Multimedia involves the combination of sound, graphics, animation, and video. A multimedia data processing system is designed to present various multimedia materials in various combinations of text, graphics, video, image, animation, sound, etc. Such a system is a combination of hardware and software. The hardware runs under the control of an operating system and multimedia application programs.

Multimedia applications impose heavy demands on the operating system to move large amounts of data from device to device, from system memory to a device, or vice-versa, in a continuous, real-time manner. Multimedia systems must support a flexible yet consistent means for transporting these large amounts of data, and control this activity accurately in real time. Data is often stored in some form of mass memory, such as a magnetic disc or optical disc. In particular, compact disc read only memory (CD-ROM) is a form of storage characterized by high capacity (roughly 650 megabytes). CD-ROM drives use laser optics rather than magnetic means for reading data. Another form of optical mass storage is a digital video disc (DVD).

Currently, optical storage devices are being improved to increase the speed of data transferred from an optical storage device for use in a data processing system. With respect to CD-ROM drives, an embedded processor is used to monitor and control the transfer of data from a CD-ROM drive to the bus in a data processing system. Presently available embedded processors used in CD-ROM decoder circuits are not fast enough to handle the bit rates provided by newer CD-ROM drives while also handling other control and housekeeping functions for the CD-ROM drive.

Therefore, it would be advantageous to have an improved method and apparatus for handling data flow from a CD-ROM drive.

SUMMARY OF THE INVENTION

The present invention provides an improved method and apparatus for transferring data in a CD-ROM system. The CD–ROM system includes a buffer manager means for identifying the capacity of a buffer memory used to store data from a disc. The buffer manager controls the transfer of data into and out of the buffer memory. Each time a sector of data is transferred from a disc into the buffer memory, a counter is incremented to track the amount of data in the buffer memory. If the counter equals the capacity of the buffer memory, the transfer of data from the disc is halted. Further transfer of data is not allowed until buffer memory is available.

Additionally, the present invention provides an error correction unit that is placed in line with data being read from the disc into the buffer memory.

Each time a sector of data is transferred from the buffer memory to the host, the same counter is decremented. If the counter equals zero, host transfers are automatically halted (without intervention from the processor) and are restarted (again, without processor intervention) when new data becomes available.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
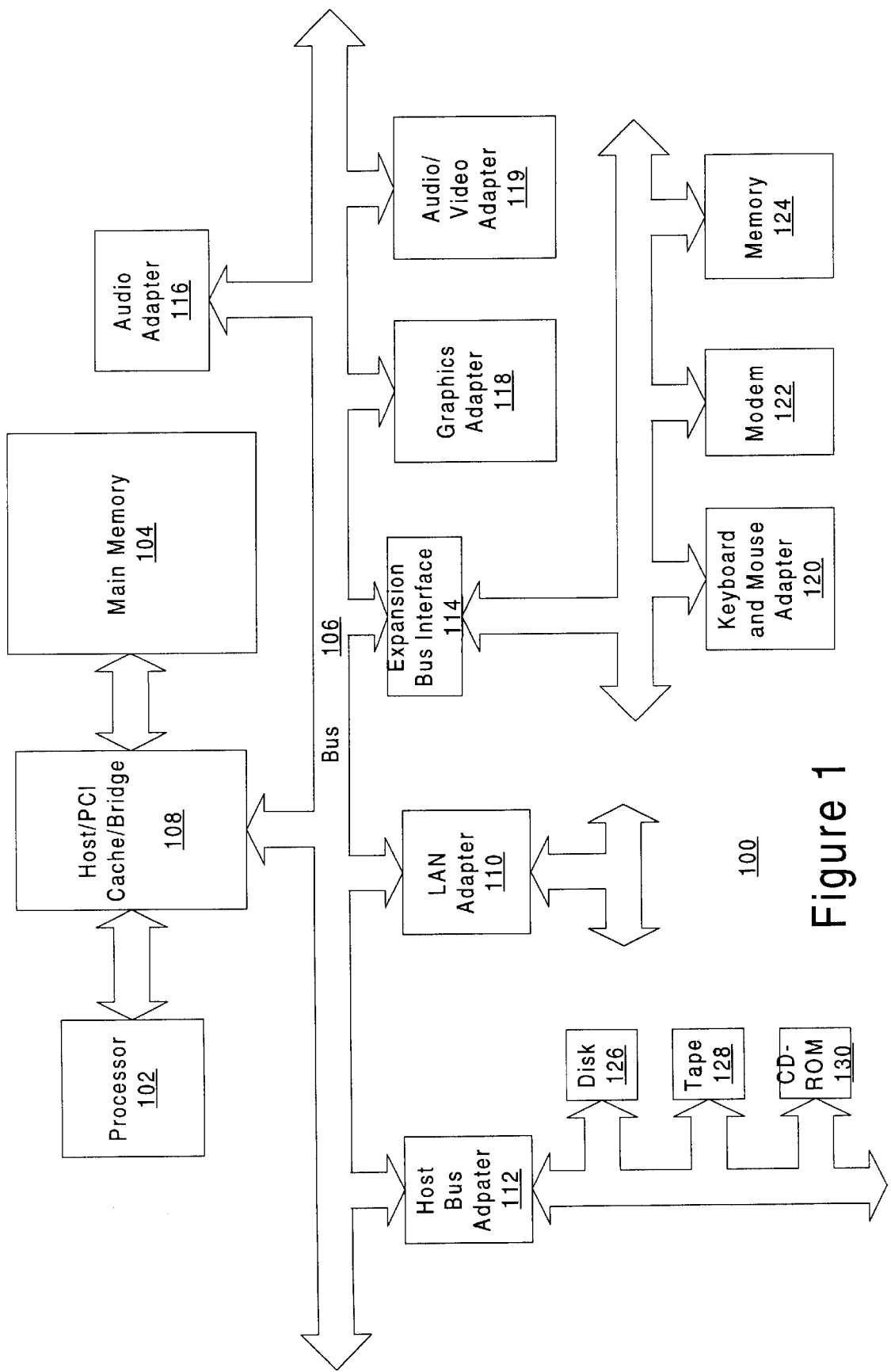
FIG. 1 is a block diagram of a data processing system in which the present invention may be implemented.

With reference now to the figures, and in particular with reference to FIG. 1, a block diagram of a data processing system 100 in which the present invention may be implemented is illustrated. Data processing system 100 employs a peripheral component interconnect (PCI) local bus architecture. Although the depicted example employs a PCI bus, other bus architectures such as Micro Channel and ISA may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, host bus adapter 112, and expansion bus interface 114 are connected to PCI local bus 106 by direct component connection. In contrast, audio adapter 116, graphics adapter 118, and audio/video adapter (A/V) 119 are connected to PCI local bus 106 by add-in boards inserted into expansion slots. Expansion bus interface 114 provides a connection for a keyboard and mouse adapter 120, modem 122, and additional memory 124. Host bus adapter 112 provides a connection for hard disk drive 126, tape drive 128, and CD-ROM 130 in the depicted example. Typical PCI local bus implementations will support three or four PCI expansion slots or add-in connectors. The depicted example includes four loads on the mother board and three expansion slots. Those of ordinary skill in the art will appreciate that the hardware in FIG. 1 may vary. For example, other peripheral devices, such as optical disc drives and the like may be used in addition to or in place of the hardware depicted in FIG. 1.

The depicted example is not meant to imply architectural limitations with respect to the present invention.

Figure 2:
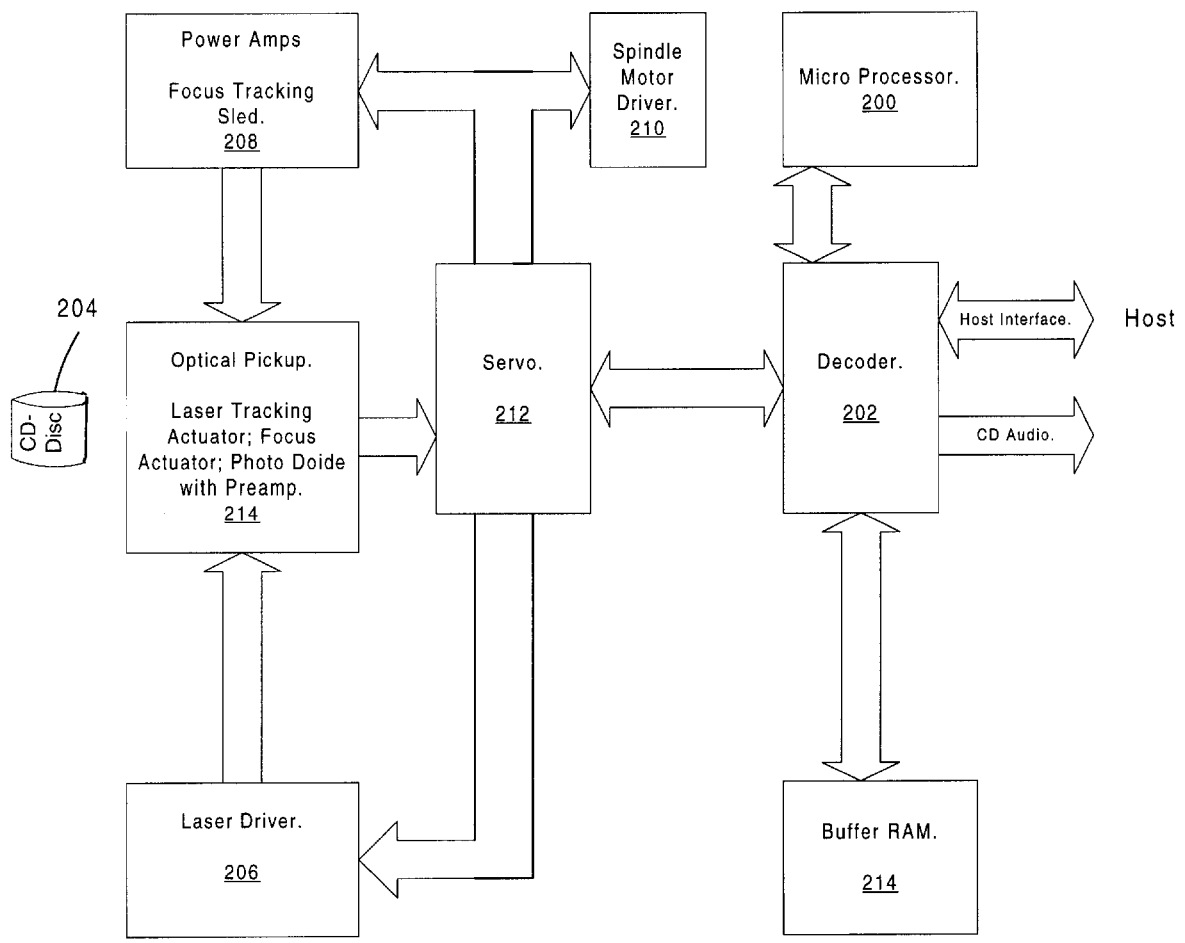
FIG. 2 is a block diagram of a CD-ROM drive in accordance with a preferred embodiment of the present invention.

Turning now to FIG. 2, a block diagram of a CD-ROM drive from FIG. 1 is depicted in accordance with a preferred embodiment of the present invention. CD-ROM 130 from FIG. 1 includes a microprocessor 200 that controls the functions within CD-ROM 130. Also included in CD-ROM 130 is a decoder 202, which serves to decode data from CD disc 204. Decoder 202 is the component in which a preferred embodiment of the present invention is implemented. Also included within CD-ROM 130 is a laser driver 206, power amps and focus tracking sled unit 208, and a spindle motor driver 210, which are controlled by servo 212. Power amps and focus tracking sled 208 includes a power amplifier and sled motors in which the power amplifier used to control current to the sled motors, positioning the sled radially above the disc surface in tracking a data bit stream. Spindle motor driver 210 controls the current to the spindle motor determining how fast it spins the disc. Optical pick up, laser tracking, actuator, focus actuator, and photo diode with pre-amplifier unit 214 send data from CD disc 204 to servo 212 for decoding by decoder 202. Buffer memory 216 is used to temporarily store data from CD disc 204 until it is sent to the host. Servo 212 serves to control laser driver 206, power amps and focus tracking sled 208, spindle motor driver 210, and optical pick up, laser tracking, actuator, focus actuator, and photo diode with pre-amplifier unit 214. Optical pick up, laser tracking, actuator, focus actuator, and photo diode with pre-amplifier unit 214 fires the laser, receives a reflection off the disc, and reads the data. Additionally, this unit moves the lens in the sled to keep the reflection in focus and the laser centered on the bit stream on the disc.

Figure 3:
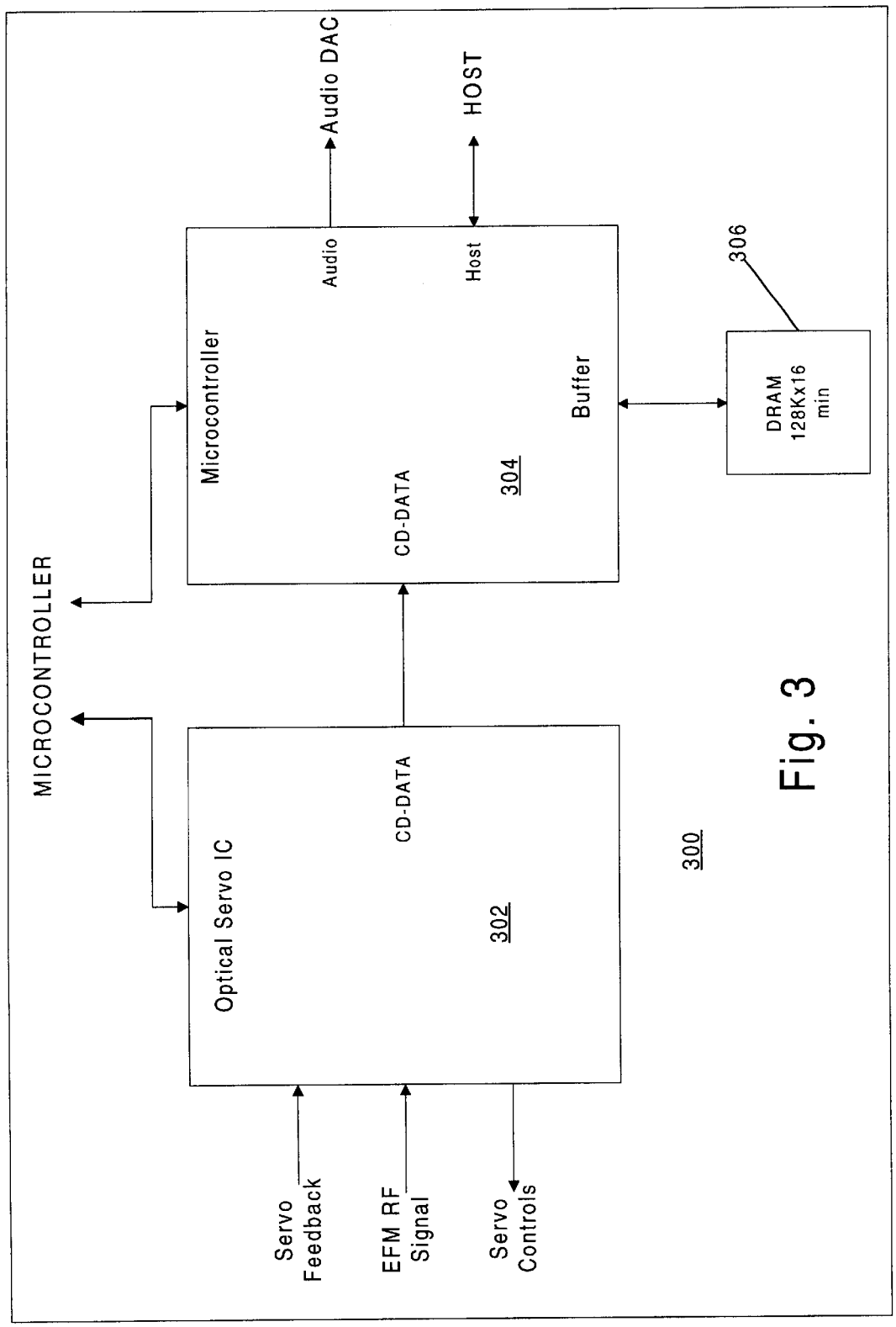
FIG. 3 is a block diagram of a two chip CD-ROM system in accordance with a preferred embodiment of the present invention.

Turning now to FIG. 3, a block diagram of a two chip CD-ROM system is depicted in accordance with a preferred embodiment of the present invention. CD-ROM system 300 includes an optical servo integrated circuit 302 and host interface integrated circuit 304 used within CD-ROM 130 in FIG. 1. Host interface integrated circuit 304 is designed to provide full error correction and host interface functions. Additionally, host interface integrated circuit 304 is configured to run with an external microcontroller for CD-ROM 130. The present invention offloads tasks from the external microcontroller, which may be an imbedded processor. Host interface integrated circuit 304 includes a microcontroller interface used to handle all chip maintenance and configuration. Additionally, this integrated circuit receives CD data from optical servo integrated circuit 302 across an industry standard interface. CD-ROM system 300 also includes a buffer memory 306 in the form of dynamic random access memory (DRAM) in the depicted example. Buffer memory 306 is used to store data read from the CD-ROM prior to being transferred to the host.

Figure 4:
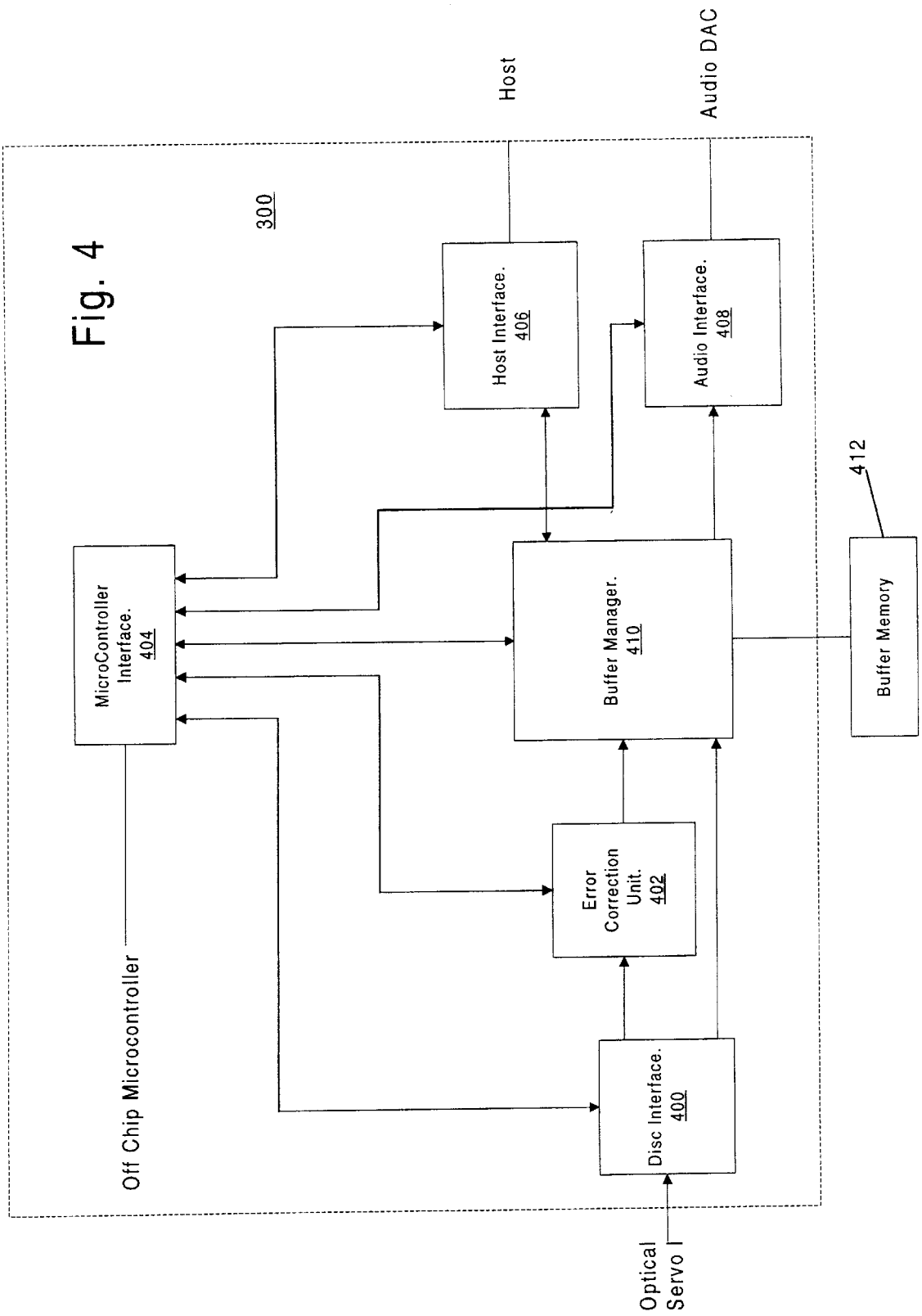
FIG. 4 is a block diagram of a host interface integrated circuit in accordance with a preferred embodiment of the present invention.

Turning now to FIG. 4, a block diagram of a host integrated circuit from FIG. 3 is depicted in accordance with a preferred embodiment of the present invention. Host integrated circuit 300 includes disc interface 400, error correction unit 402, microcontroller interface 404, host interface 406, audio interface 408, and buffer manager 410. Buffer manager 410 provides the interface and arbitration between external buffer memory 412 and disc interface 400, error correction unit 402, microcontroller interface 404, host interface 406, and audio interface 408.

Optical data enters the read channel from the optical disc with disc interface 400 receiving the data, decoding it into a CD-ROM standard sector format, and sending the data to buffer manager 410 and error correction unit 402. The data includes all information necessary for error correction unit 402 to perform error correction on the optical data obtained from the disc. For example, the data includes error flags and parity information in which a non-zero value signals the existence of erroneous data, causing error correction unit 402 to perform error correction on the sector. A sector of data is a portion of the data storage area on a disc. More specifically, with respect to a CD, a sector is a logical unit of data on a CD comprising 2352 logical bytes of data. Error correction unit 402 detects errors in data and generates correction masks for those bytes of data that require correction. This unit sends updated correction information to external buffer memory 412, replacing data written by disc interface 400. Error correction 402 also sends cleared parity and flag data to the buffer.

Buffer manager 410 receives the data and stores the data in external buffer memory 412. Error flags and parity information also are stored within external buffer memory 412. Buffer manager 410 arbitrates with disc interface 400, error correction unit 402, and host interface 406 to store corrected data and updated error correction information on external buffer memory 412. Buffer manager 410 arbitrates with audio interface 408 and host interface 406 for read access to external buffer memory 412. Host interface 406 requests data from buffer manager 410, which in turn sends the data in a format used by the host to the host. Buffer manager 410 arbitrates with error correction unit 402 and disc interface 400 to read data from the buffer and send to the host interface 406. The requesting and receiving of data by audio interface 408 operates in a fashion similar to host interface 406.

Figure 5:
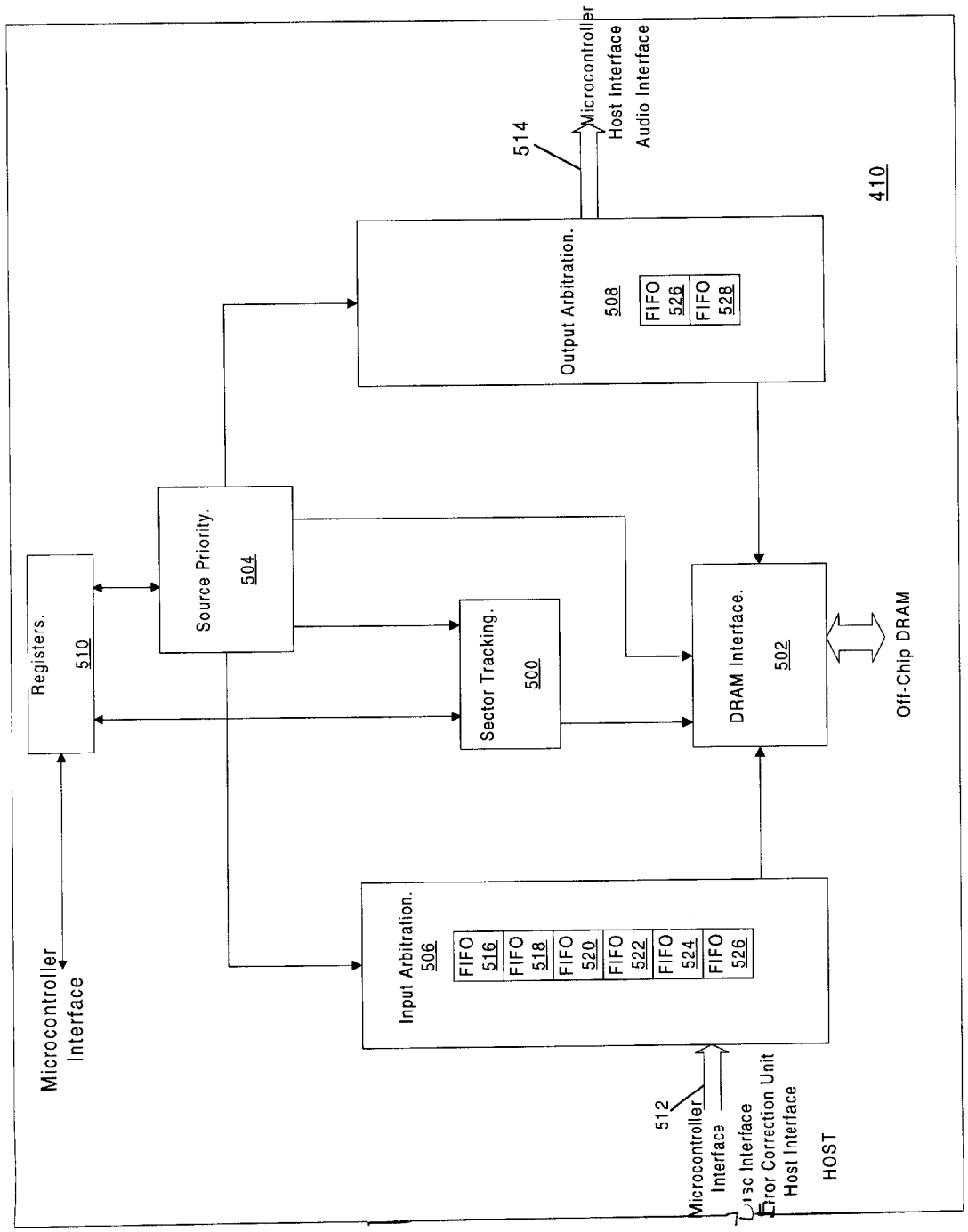
FIG. 5 is a block diagram of a buffer manager in accordance with a preferred embodiment of the present invention.

Turning now to FIG. 5, a block diagram of a buffer manager from FIG. 4 is depicted in accordance with a preferred embodiment of the present invention. Buffer manager 410 includes sector tracking logic 500, DRAM interface 502, source priority logic 504, input arbitration logic 506, output arbitration logic 508, and registers 510.

Sector tracking logic 500 provides a logical address from the disc, which includes a sector number and an index for the sector. DRAM interface 502 uses this logical address to produce a physical address within the buffer memory to indicate where the data is physically located. DRAM interface 502 also provides for timing of reads and writes out of and into the buffer memory. In the depicted example, the buffer memory is a DRAM.

Input arbitration logic 506 and output arbitration logic 508 are basically input and output blocks controlled by source priority logic 504. Write channels 512 from disc interface 400, error correction unit 402, and host interface 406 are connected to input arbitration logic 506. Read channels 514 from microcontroller interface 404, host interface 406, and audio interface 408 are connected to output arbitration logic 508. All channels but those to host interface 406 are one byte wide. The channel for host interface 406 in the depicted example is a double word wide. The channel from DRAM interface 502 to the DRAM is one word (two bytes) wide. Each read and write channel connected to buffer manager 410 includes a first in and first out (FIFO) memory to buffer data until access to the buffer memory is assigned by source priority logic 504. In the depicted example, input arbitration logic 506 includes six FIFOs, FIFOs 516, 518, 520, 522, 524, and 526, for receiving data from write channels 512. Output arbitration block 508 includes two FIFOs, FIFOs 528 and 526 for use with read channels 514.

Source priority logic 504 is employed to assign priority and arbitrate access to the external buffer memory through input arbitration logic 506 and output arbitration logic 508. In the depicted example, buffer manager 410 assigns priorities to the other components within the integrated circuit requesting access to the buffer memory as follows: microcontroller interface 404-single access; buffer memory refresh-single access; disc interface 400-multiple accesses; error correction unit 402-multiple random page-mode access; host interface 406-multiple page-mode accesses; and audio interface 408-multiple page-mode accesses. Once a full multisector transfer is complete, buffer manager 410 will enter a clean up mode to insure that all of the input FIFO memories have written all residual data to the buffer memory.

Figure 6:
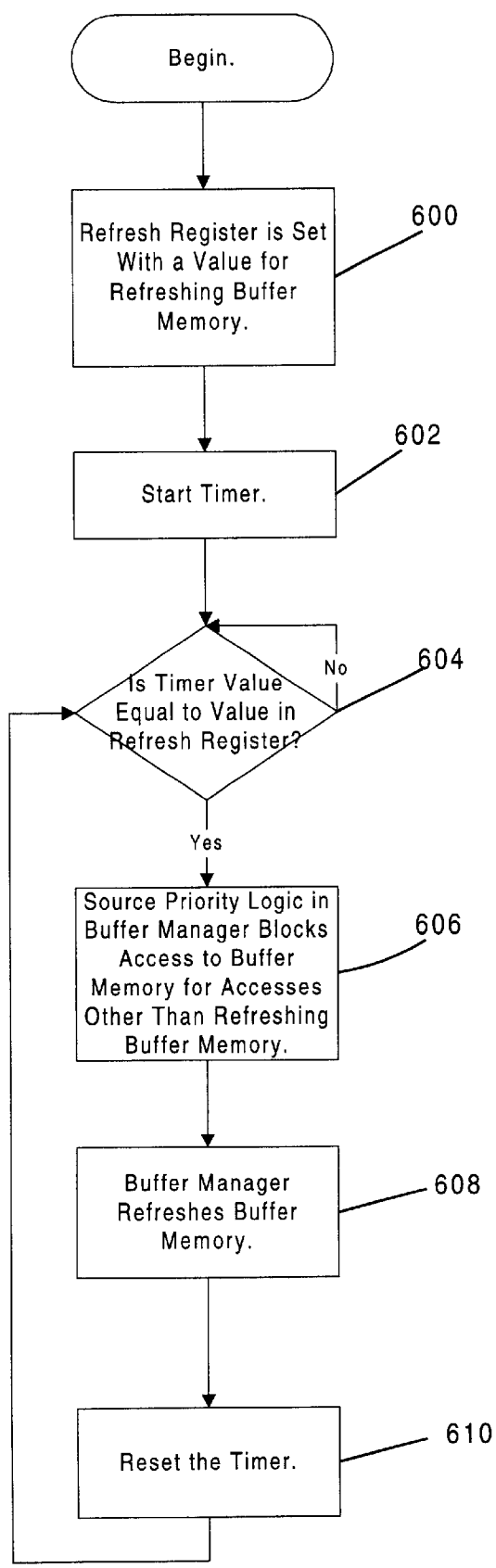
FIG. 6 is a flowchart for a process for refreshing buffer memory in accordance with a preferred embodiment of the present invention.

With reference now to FIG. 6, a flowchart for a process for refreshing a buffer memory is depicted in accordance with a preferred embodiment of the present invention. Refresh register is set with a value for refreshing the buffer memory (step 600) and start timer (step 602). Next, a determination is made as to whether timer value is equal to value in refresh register (step 604). If the timer is equal to the refresh value, the source priority logic in the buffer manager blocks. further access to buffer memory for accesses other than refreshing the buffer memory (step 606). A burst access will be stopped after the current access, and an individual access will be allowed to complete with any new access request being held until after the refresh of the buffer memory has occurred. The buffer manager refreshes buffer memory (step 608) and resets the timer (step 610) with the process returning to step 604. If the timer is not equal to the value in the refresh register in step 604, the process returns to step 604 to make another determination.

Figure 7:
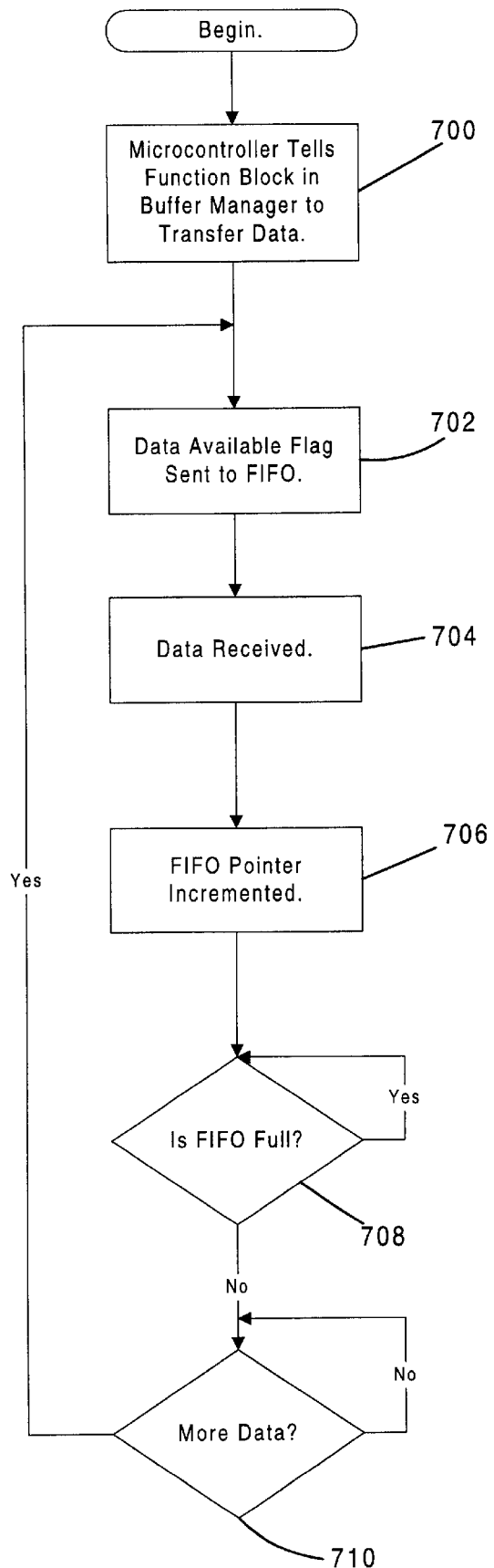
FIG. 7 is a flowchart for a process for writing data from a function block outside of the buffer manager to a FIFO in the buffer manager in accordance with a preferred embodiment of the present invention.

Turning now to FIG. 7, a flowchart for a process for writing data to a write FIFO memory is depicted in accordance with a preferred embodiment of the present invention. The process begins with the microcontroller sending a message to a selected function block to transfer data to the buffer memory (step 700). Function blocks that write data to the write FIFO include disc interface 400, host interface 406, and error correction unit 402 in buffer manager 300 in FIG. 4. The microcontroller selects a function block by setting an appropriate register within registers 510 in buffer manager 410.

A data available flag is sent to the write FIFO memory (step 702). This flag indicates that data is to be written into the FIFO memory. The data is then received (step 704), and the write FIFO pointer is incremented (step 706). A determination is then made as to whether the write FIFO is full (step 708). If the write FIFO is full, the process continues to return to step 708. Otherwise, the process determines whether more data is available for transfer (step 710). If additional data is not available for transfer, the process returns to step 710. Upon detecting additional data being available for transfer, the process then returns to step 702 as described above.

Figure 8:
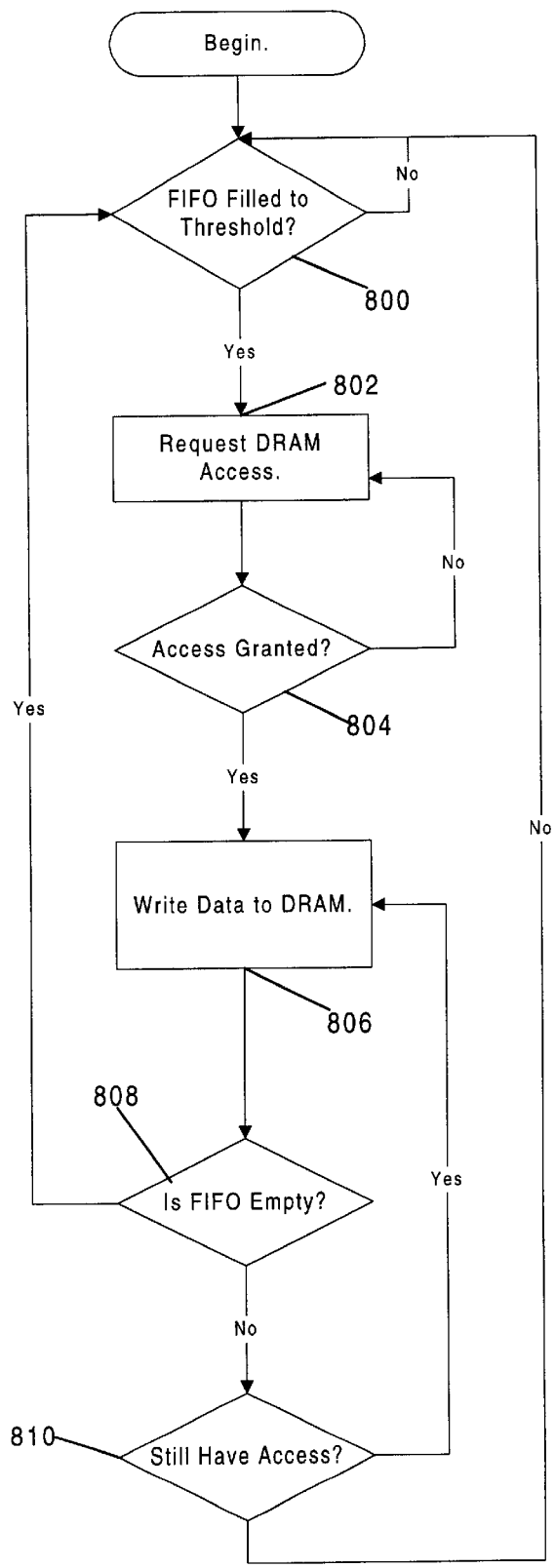
FIG. 8 is a flowchart for a process for transferring data from a FIFO in the buffer manager to buffer memory in accordance with a preferred embodiment of the present invention.

Turning now to FIG. 8, a flowchart for a process for transferring data from the FIFO memory to buffer memory is depicted in accordance with a preferred embodiment of the present invention. The process begins by determining whether the write FIFO memory is filled to a threshold level (step 800). If the write FIFO memory is not filled to the threshold level, the process returns to step 800. Upon determining that the FIFO memory is filled to the threshold level, the process then requests access to the buffer memory, which is a DRAM in the depicted example (step 802). A determination is then made as to whether access to the DRAM has been granted (step 804). If access to the DRAM has not been granted, the process returns to step 802 to make another request for access to the DRAM. Upon receiving access to the DRAM, data is then written to the DRAM (step 806). The write to the DRAM is initiated by DRAM interface 502 in the buffer manager 410. The address is set by DRAM interface 502 with data from sector tracking logic 500. In writing data to the DRAM, the DRAM interface generates DRAM addresses (physical addresses) for data in all cases except for error correction data. Error correction data is written to addresses supplied by the error correction unit 402. Additionally, error correction unit also may read data within the DRAM or write corrected data to the DRAM using a correction mask.

A determination is then made as to whether the FIFO memory is empty (step 808). If the FIFO memory is empty, the process then returns to step 800 to monitor the FIFO memory to detect data filling this memory to the threshold level. Data may be written to the FIFO memory in the manner described in FIG. 7 at the same time data is written to the DRAM as described in FIG. 8. If the FIFO is not empty, a determination is made as to whether the particular function still has access to the DRAM (step 810). If access to the DRAM is still present, the process then returns to step 806 to write additional data to the DRAM. If access to the DRAM is rescinded, the process returns to step 800 as described above. Access may be rescinded if another function has higher priority to the DRAM, such as, for example, refreshing the DRAM.

Figure 9:
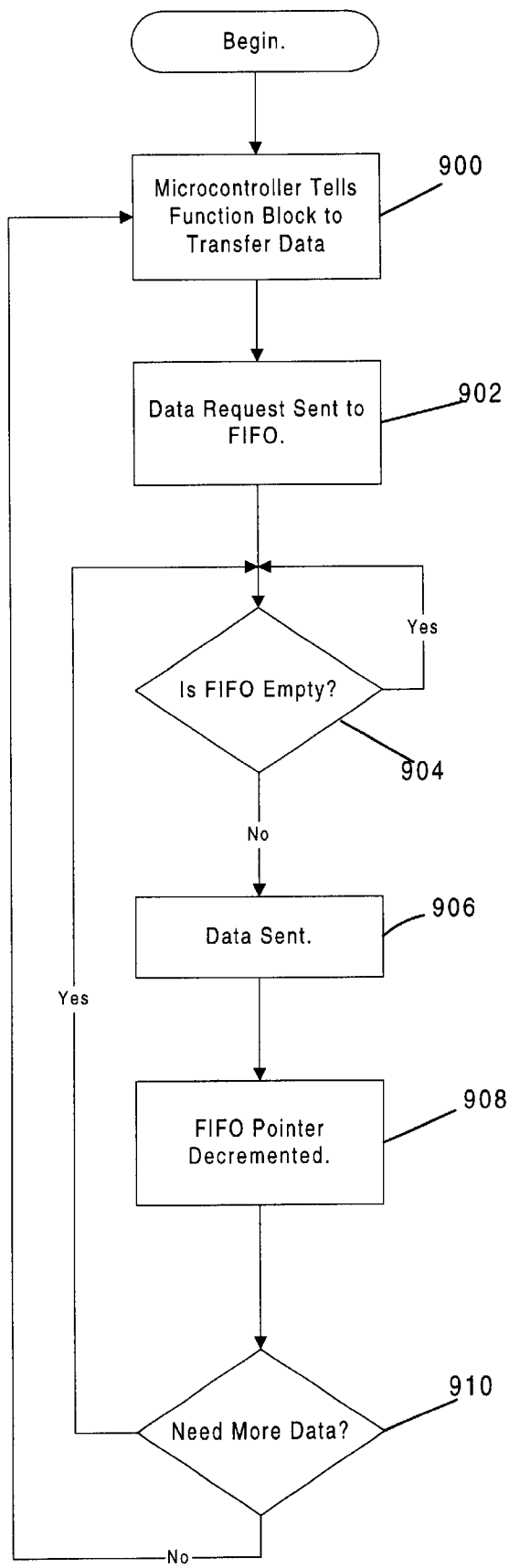
FIG. 9 is a flowchart of a process for transferring data from a FIFO in the buffer manager to a function block outside the buffer manager in accordance with a preferred embodiment of the present invention.

Turning now to FIG. 9, a flowchart of a process for transferring data from a read FIFO to a function block outside the buffer manager is depicted in accordance with a preferred embodiment of the present invention. The process begins with the microprocessor sending a message to a function block, wherein the message instructs the function block to transfer data from the read FIFO memory to the function block (step 900). Function blocks that read data from a read FIFO include host interface 406 and audio interface 408 within buffer manager 300 in FIG. 4. A function block is selected for reading data from a read FIFO memory by setting the appropriate register or registers within registers 510 in buffer manager 410.

Next, the data request is sent to the read FIFO memory (step 902). In response to receiving the read request, a determination is made as to whether the read FIFO is empty (step 904). If the FIFO memory is empty, the process then returns to step 904 until the read FIFO memory is not empty. At that time, data is then sent from the read FIFO memory to the function block (step 906). Then, the FIFO pointer in the read FIFO memory is decremented (step 908). A determination is then made as to whether the function block requires more data (step 910). If more data is needed, the process returns to step 904 to determine whether data is present within the read FIFO memory. If more data is not needed, the process then returns to step 900 as described above.

Figure 10:
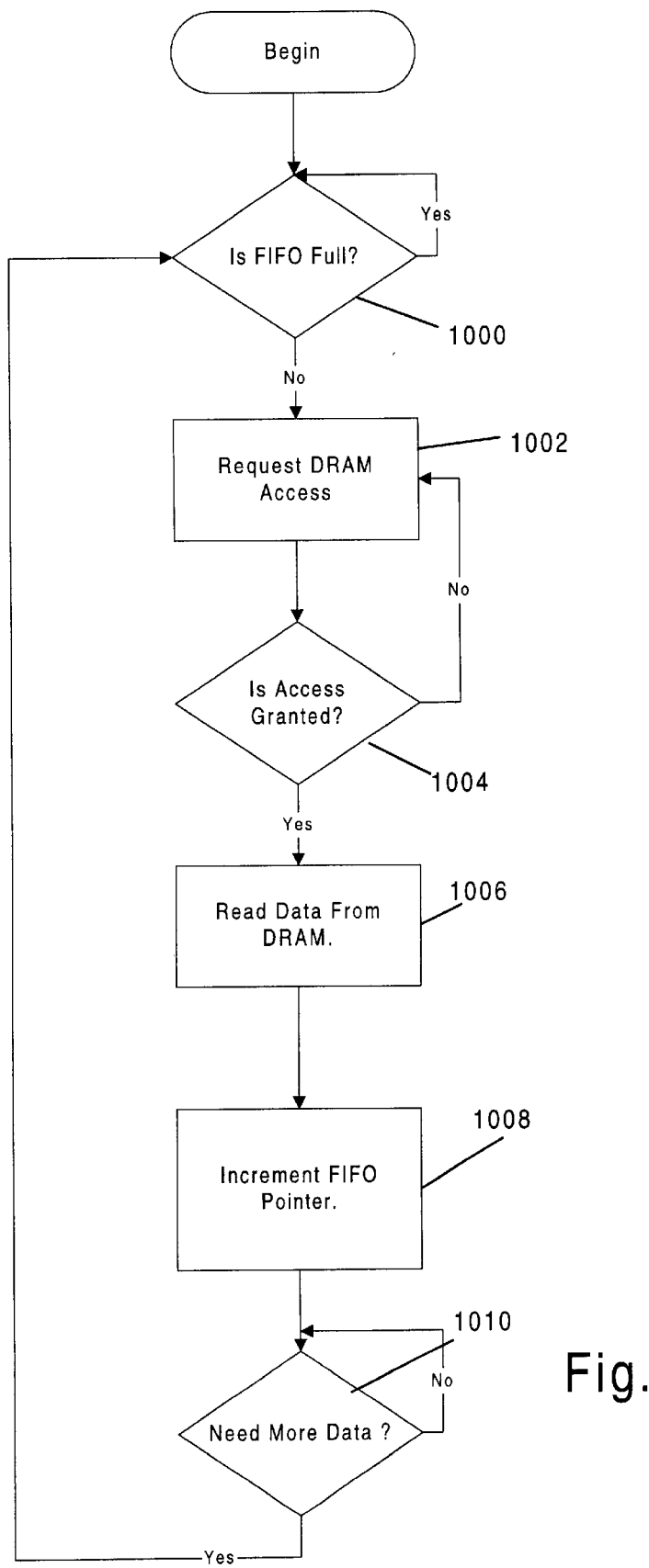
FIG. 10 is a flowchart for a process for transferring data from a buffer memory to a FIFO in accordance with a preferred embodiment of the present invention.

Turning now to FIG. 10, a flowchart for a process for transferring data from a buffer memory to a FIFO memory is depicted in accordance with a preferred embodiment of the present invention. The process shown in FIG. 10 may occur at the same time as the process illustrated in FIG. 9.

Still referring to FIG. 10, the process begins with a determination of whether the FIFO memory is full (step 1000). If the FIFO is full, the process then returns to step 1000. Otherwise, a request for DRAM access is made (step 1002). This request is sent to source priority logic 504. Next, a determination is made as to whether access to the DRAM has been granted (step 1004). The process returns to step 1002 until access is granted to the function block by source priority logic 504. Upon receiving a grant of access to the DRAM, data is then read from the DRAM to the FIFO memory (step 1006). The actual reading of data in step 1006 is initiated by DRAM interface 502 within buffer manager 410. After data is read from the DRAM into the FIFO memory, the FIFO pointer for the FIFO memory is incremented (step 1008). A determination is made as to whether more data is needed (step 1010). If more data is needed, the process returns to step 1000. Otherwise, the process continues to return to step 1010.

In the depicted example, all of the channels but those to the host interface are one byte wide. The host interface has a double word wide channel. The DRAM has a one word wide channel. As a result, the host FIFO pointer is incremented once every two DRAM read or write transactions occur. All other FIFO pointers, except for error correction, increment once for every two channel accesses (i.e., once for DRAm access). Access to the DRAM by the error correction unit uses a channel that is one byte wide with a one byte wide FIFO memory associated with the FIFO for the error correction unit.

Figure 11:
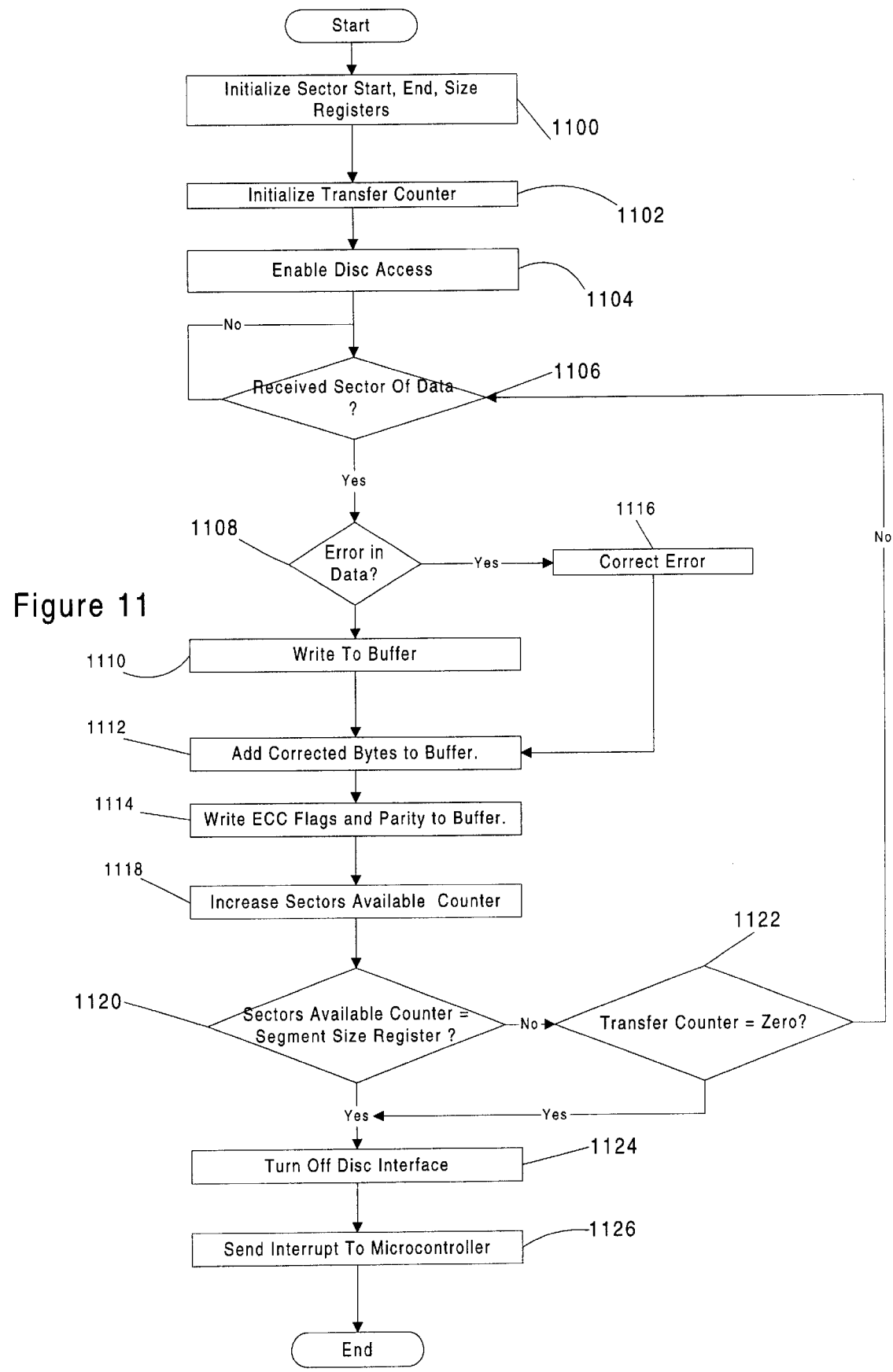
FIG. 11 is a flowchart of a process for controlling data read from a disc interface in accordance with a preferred embodiment of the present invention.

With reference now to FIG. 11, a flowchart of a process for controlling data read into a disc interface is depicted in accordance with a preferred embodiment of the present invention. The process begins by initializing the control registers (step 1100) and writing a transfer size (step 1102). The process then allows disc access at the disc interface (step 1104). A determination is then made as to whether a sector has been received (step 1106). The process continues to return until a sector of data has been received. A determination is then made as to whether erroneous data was received (step 1108) while the process writes the data to the buffer memory (step 1110). If an error occurs, the error is corrected by the error correction unit (step 1116). The corrected bytes are added to the buffer memory, replacing erroneous data (step 1112), and error correction and control flags and parity data are written into the buffer memory (step 1114). Step 1110 occurs in parallel with step 1116 even when an error occurs. In other words, data is written to the buffer regardless whether an error has occurred in the data received from the disc.

Then, the sectors available counter is incremented (step 1118). A determination is then made as to whether the sector available counter is equal to the segment size register value (i.e. buffer full) (step 1120). If the answer to this determination is no, then the process then determines whether the transfer counter is equal to zero (step 1122). If the transfer counter is not equal to zero, the process returns to step 1106. If the transfer counter is equal to zero, the process then turns off the disc interface block (step 1124). This prevents additional data from being read into the disc interface until room is available in the buffer memory. The process also proceeds to step 1124 if the sectors available counter is equal to the segment size register value. The segment size register value equals the maximum number of sectors, which can be stored in the current buffer. When the sectors available counter is equal to the segment size, the buffer is full. Additionally, an interrupt is sent to the microcontroller to indicate that the buffer memory is full (step 1126).

Figure 12:
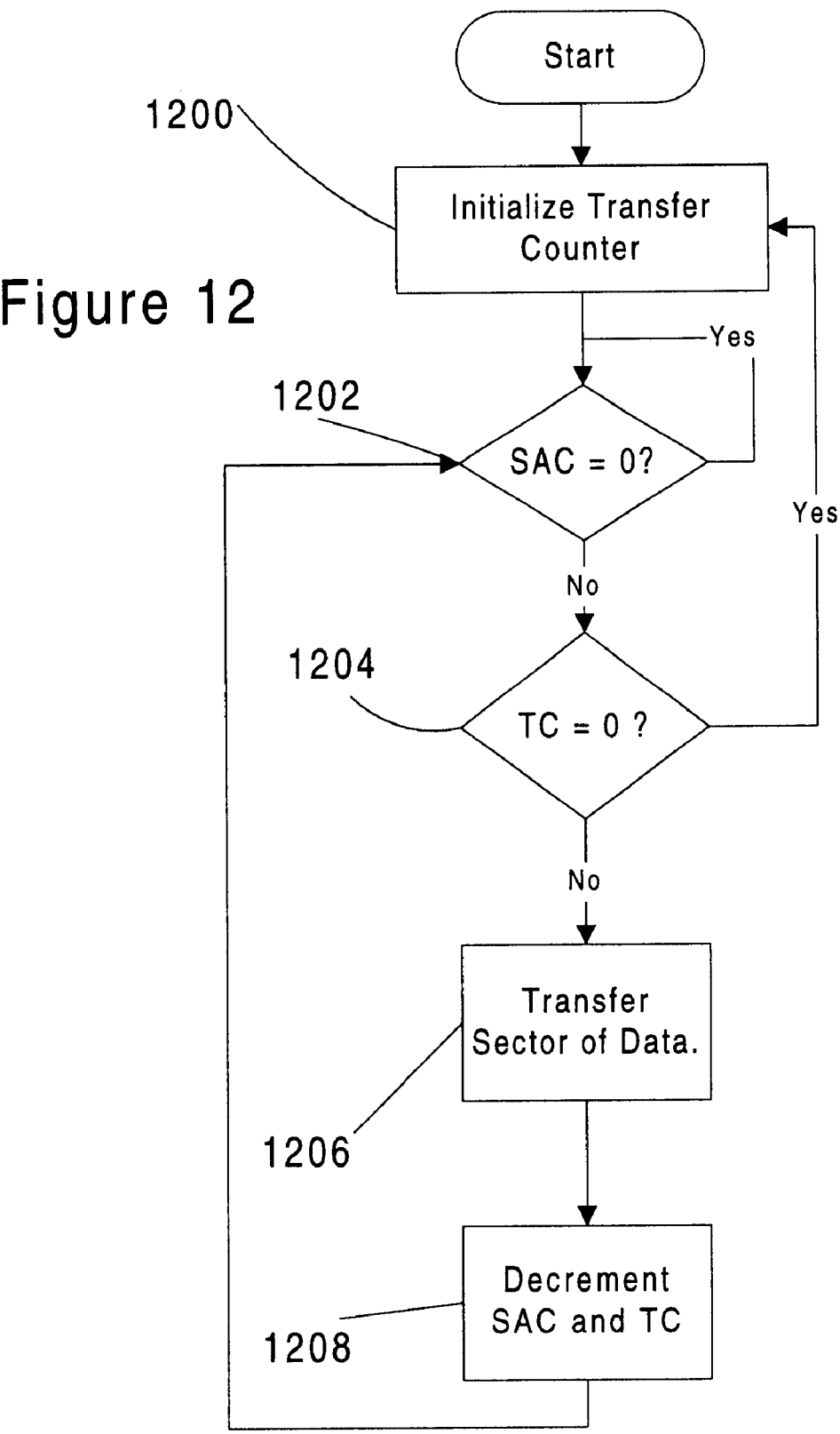
FIG. 12 is a flowchart of a process for monitoring data transfer out of a buffer memory in accordance with a preferred embodiment of the present invention.

With reference now to FIG. 12, a flowchart of a process for monitoring data transfer out of a buffer memory is depicted in accordance with a preferred embodiment of the present invention. The process begins by initializing a transfer counter (TC) (step 1200). Thereafter, a determination is made as to whether the sectors available counter (SAC) is equal to zero (step 1202). As long as the SAC is equal to zero, the process returns to step 1202. When the SAC is not equal to zero, the process then determines whether the TC is equal to zero (step 1204). If the TC is equal to zero, the process returns to step 1200. Otherwise, a sector of data is transferred (step 1206), and the SAC and the TC are decremented (step 1208). Thereafter, the process returns to step 1202.

Figure 13:
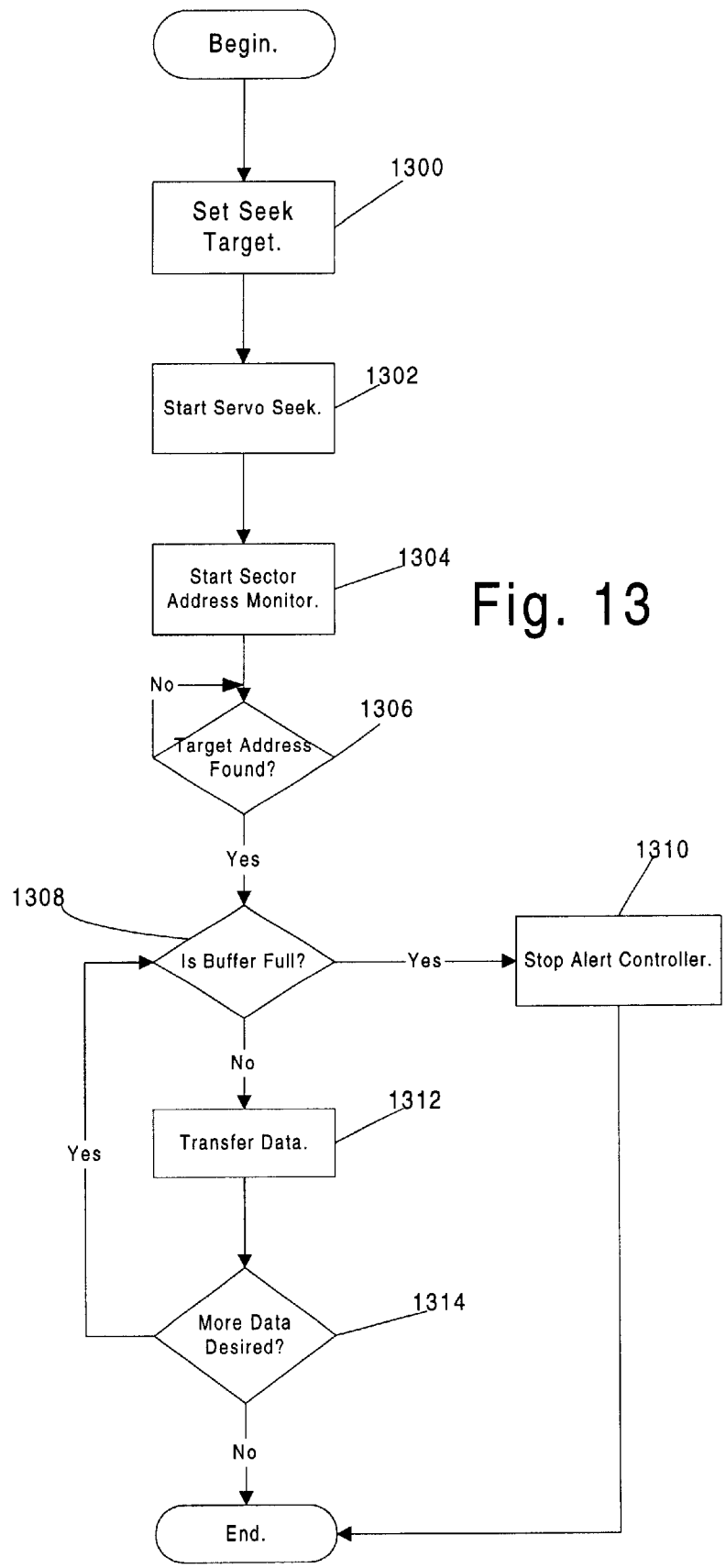
FIG. 13 is a flowchart of a process for turning on a disc interface in accordance with a preferred embodiment of the present invention.

With reference now to FIG. 13, a flowchart of a process for turning on a disc interface is depicted in accordance with a preferred embodiment of the present invention. The process begins by setting the seek target (step 1300). Step 1300 loads control registers with the sector address of the desired sector of data. Then, the servo seek is started off the integrated circuit (step 1302). The process then starts the sector address monitor (step 1304), which in essence turns on the disc interface. The process then determines whether the target address has been found (step 1306). The process returns to step 1306 until a target address is found. When the target address is found, a determination is then made as to whether the buffer memory is full (step 1308). If the buffer memory is full, the process stops and alerts the microcontroller that the buffer is full (step 1310) and the process terminates. Otherwise, the process transfers data from the disc (step 1312). A determination is then made as to whether more data is desired (step 1314). If more data is desired, the process returns to step 1308. Otherwise, the process terminates.

The description of the preferred embodiment of the present invention has been presented for purposes of illustration and description, but is not limited to be exhaustive or limited to the invention in the form disclosed. Many modifications and variations will be apparent to those of ordinary skill in the art. That the embodiment was chosen and described in order to best explain the principles of the invention the practical application to enable others of ordinary skill in the art to understand the invention for various embodiments with various modifications as are suited to the particular use contemplated.

What is claimed is:

1. An integrated circuit comprising:
   a microcontroller interface, wherein the microcontroller interface is configured to communicate with a microcontroller;
   a data interface, wherein the data interface is configured to receive data from a storage device;

a host interface, wherein the host interface is configured to send data to a host;

a buffer manager which includes:

reception means for receiving data from the data interface;

storage means for storing the received data in a memory;

determination means for determining whether space in the memory is available to store data;

control means, responsive to a determination that space in the memory is unavailable, for halting transfer of data to the memory; and an error correction unit that receives the data from the storage device via the data interface, corrects errors in the received data by generating correction information, and overwrites erroneous data stored in the memory by the storage means, without intervention from the microcontroller.

2. The integrated circuit of claim 1 further comprising:

transfer means for sending data to the host through the host interface.

3. The integrated circuit of claim 1 further comprising:

second determination means for determining whether data is available in the memory to be transferred to the host; and transfer means for sending data to the host through the host interface, responsive to the second determination means determining data is available.

4. The integrated circuit of claim 1 further comprising:

determination means for determining whether data is available in the memory; and transfer means for transferring data from the memory to the host, wherein transfer of data is automatically halted in response to a determination that data is unavailable and wherein transfer of data is automatically restarted in response to data being available.

5. The integrated circuit of claim 4, wherein the determination means includes a counter, wherein the counter is incremented each time a sector of data is transferred to the memory and is decremented each time a sector of data is transferred from the memory and wherein a determination that space in the memory is unavailable is made when the counter is equal to zero.

6. The integrated circuit of claim 1, wherein the control means halts transfer of the data to the memory by turning off the data interface.

7. The integrated circuit of claim 1, wherein the control means further includes interrupt means for sending to the microcontroller an interrupt indicating that the transfer of data has been halted.

8. The integrated circuit of claim 1, wherein the buffer manager includes second control means, responsive to a condition in which data transfer has been halted, responsive to a determination that space in the memory is available to store data, and to a signal from the microcontroller, for resuming transfer of data to the memory.

9. An integrated circuit comprising:

a microcontroller interface, wherein the microcontroller interface is configured to communicate with a microcontroller;

a data interface, wherein the data interface is configured to receive data from a storage device;

a host interface, wherein the host interface is configured to send data to a host;

a buffer manager which includes:

reception means for receiving data from the data interface;

storage means for storing the received data in a memory;

determination means for determining whether space in the memory is available to store data;

control means, responsive to a determination that space in the memory is unavailable, for halting transfer of data to the memory; and an error control unit having an input coupled to the data interface and an output coupled to the buffer manager, wherein the error control unit receives data from the data interface and detects and corrects errors in data stored in the memory, without intervention from the microcontroller.

10. The integrated circuit of claim 1, wherein the buffer manager includes transfer means for transferring data from the memory to a host through the host interface.

11. The integrated circuit of claim 10, wherein the buffer manager includes second control means for automatically stopping transfers of data from the memory to the host in response to data being absent from the memory and for automatically restarting transfer of data from the memory to the host in response to data being present in the memory, wherein the halting and restarting of transfer of data occurs without intervention from the microcontroller.

12. The integrated circuit of claim 1, wherein the determination means includes a counter that is incremented in response to a sector of data being transferred and a value that is selected to indicate a maximum number of sectors available in the memory, wherein the determination means increments the counter each time a unit of data is transferred and compares the counter to the value to determine whether space is available in the memory to store data.

13. An integrated circuit comprising:

a first interface configured for connection to a microcontroller, wherein a transfer of data from an optical storage device is initiated by commands from the microcontroller;

a second interface configured to receive data from the optical storage device;

initiation means for initiating the transfer of data from the optical storage device through the second interface;

reception means for receiving data in response to receiving a command from the microcontroller to transfer data;

storage means for storing the received data in a buffer memory;

determination means for determining whether space in the buffer memory is available to store data;

control means, responsive to a determination that space in the memory is unavailable, for halting transfer of data to the buffer memory; and error correction means for receiving the data from the optical storage device via the second interface and correcting errors in the received data by generating correction information used to overwrite erroneous data stored in the storage means, without intervention from the microcontroller.

14. The integrated circuit of claim 13, wherein the control means halts transfer of the data to the buffer memory by turning off the data interface.

15. The integrated circuit of claim 13 further comprising:

a second control means, responsive to a condition in which data transfer has been halted and responsive to a determination that space in the buffer memory is available to store data, for resuming transfer of data to the buffer memory.

16. An integrated circuit comprising:

a disc interface, wherein the disc interface receives data from an optical disc;

a microcontroller interface, wherein a command to transfer data from the optical disc to a host is received at the microcontroller interface;

an error correction unit that receives the data from the optical disc via the disc interface, corrects errors in the received data by generating correction information, and overwrites erroneous data stored in a memory, without intervention from the microcontroller; and a logic unit connected to the disc interface and the microcontroller interface having a plurality of modes of operation including:

a first mode of operation in which the logic unit detects a transfer of data;

a second mode of operation, responsive to detecting a transfer of data, in which the logic unit determines whether space is available in the memory for data; and a third mode of operation, responsive to a determination that space for data is unavailable in the memory, in which the logic unit halts the transfer of data without intervention by the microcontroller.

17. The integrated circuit of claim 16, wherein the logic unit further includes:

a fourth mode of operation, responsive to receiving a command to transfer data to the host, in which data is transferred from the memory to a host interface;

a fifth mode of operation, responsive to detecting an absence of data in the memory, in which transfer of data to the host interface is automatically halted; and a sixth mode of operation, responsive to halting of transfer of data in the fifth mode of operation and to detecting a presence of data in the memory, in which transfer of data to the host interface is automatically restarted.

18. The integrated circuit of claim 17, wherein the logic unit includes a seventh mode of operation in which transfer of data to the host interface is automatically halted when the transfer is done.

19. The integrated circuit of claim 16, wherein the memory is a dynamic random access memory.

20. The integrated circuit of claim 16, wherein the circuit is a buffer manager.

21. The integrated circuit of claim 20, wherein the buffer manager includes a buffer memory interface configured for connection to a buffer memory, wherein data is transferred from the disc interface to the buffer memory in response to the command.

22. An optical disc drive comprising:

a microprocessor;

a photodiode;

an optical pickup unit, wherein the optical pickup unit receives data from a disc in the optical disc drive;

a servo unit connected to the optical pickup unit and the photodiode, wherein the servo unit controls the optical pickup unit and the photodiode and receives data from the optical pickup unit;

a buffer memory, wherein data is stored in the buffer memory prior to being transferred to a host;

a decoder connected to the servo unit, the microcontroller, and the buffer memory, wherein the decoder receives data from the servo unit and includes:

a disc interface, wherein the disc interface provides communication with the servo unit;

a host interface;

a microprocessor interface;

a buffer manager which includes:

an input unit having a connection to the disc interface, the microprocessor interface, and the host interface; and an output unit having a connection to the microprocessor interface and the host interface, wherein the buffer manager receives data from the disc interface and transfers data to the buffer memory in response to a first command from the microprocessor, transfer of data to the buffer memory is halted when space is unavailable in the buffer memory, data is transferred from the buffer memory to the host interface in response to a second command from the microprocessor, transfer of data to the host interface is automatically halted when the buffer memory is empty without intervention from the microprocessor, and transfer of data to the host interface is automatically restarted when data is available in the buffer without intervention from the microprocessor; and an error correction unit that receives the data from the disc via the optical pickup unit, corrects errors in the received data by generating correction information, and overwrites erroneous data stored in the buffer memory, without intervention from the microprocessor.

23. The integrated circuit of claim 1, wherein the data from the storage device includes error flags and parity information.

24. The integrated circuit of claim 13, wherein the data from the optical storage device includes error flags and parity information.

25. The integrated circuit of claim 16, wherein the data from the optical disc includes error flags and parity information.

26. The optical disc drive of claim 22, wherein the data from the disc includes error flags and parity information.

* * * * *